(12) United States Patent
Nett et al.

(10) Patent No.: US 9,291,212 B2
(45) Date of Patent: Mar. 22, 2016

(54) CLUTCH ASSEMBLY HAVING AN OIL ACCUMULATING DEVICE

(71) Applicant: GKN Driveline Köping AB, Köping (SE)

(72) Inventors: Hans-Peter Nett, Adenau (DE); Christoph Göttert, Köln (DE)

(73) Assignee: GKN Driveline Koping AB, Koping (SE)

( * ) Notice: Subject to any disclaimer, the term of this patent is extended or adjusted under 35 U.S.C. 154(b) by 0 days.

(21) Appl. No.: 14/346,772

(22) PCT Filed: Sep. 25, 2012

(86) PCT No.: PCT/EP2012/068873
§ 371 (c)(1),
(2) Date: Mar. 24, 2014

(87) PCT Pub. No.: WO2013/045445
PCT Pub. Date: Apr. 4, 2013

(65) Prior Publication Data
US 2014/0231211 A1    Aug. 21, 2014

(30) Foreign Application Priority Data
Sep. 30, 2011    (EP) .................................... 11183508

(51) Int. Cl.
*F16H 57/04*    (2010.01)
*F16D 13/74*    (2006.01)

(52) U.S. Cl.
CPC .............. *F16D 13/74* (2013.01); *F16H 57/045* (2013.01); *F16H 57/0442* (2013.01); *F16H 57/0471* (2013.01); *F16H 57/0473* (2013.01); *F16H 57/0424* (2013.01); *F16H 57/0483* (2013.01)

(58) Field of Classification Search
None
See application file for complete search history.

(56) References Cited

U.S. PATENT DOCUMENTS 4,586,395 A * 5/1986 Fukuchi et al. ................. 74/467
6,345,712 B1    2/2002 Dewald et al.
6,474,444 B1 * 11/2002 Mochizuki .................. 184/6.12
(Continued)

FOREIGN PATENT DOCUMENTS

DE          1801917          5/1970
DE        102008002844      11/2009
(Continued)

OTHER PUBLICATIONS

International Preliminary Report on Patentability.
(Continued)

*Primary Examiner* — Rodney H Bonck
(74) *Attorney, Agent, or Firm* — Bejin Bieneman PLC

(57) ABSTRACT

The invention relates to a clutch assembly of a motor vehicle, in particular a clutch-controlled differential unit, comprising a switchable clutch apparatus that is able to transmit driving power from a drive element on the input side with regard to the clutch device to a drive element on the output side with regard to the clutch device, wherein an oil conveying apparatus is provided for the clutch oiling, which oil conveying apparatus conveys oil of an oil circuit serving the clutch device depending on the operating state. In order to ensure that the lubrication of components arranged on the output side with regard to the clutch device is ensured in operating states in which the oil conveying apparatus does not convey any oil, an oil accumulating device is provided.

14 Claims, 2 Drawing Sheets

(56) References Cited

U.S. PATENT DOCUMENTS

| | | | |
|---|---|---|---|
| 7,229,376 B1 * | 6/2007 | Irwin | 475/160 |
| 2009/0072081 A1 * | 3/2009 | Regonini et al. | 244/60 |
| 2009/0277711 A1 | 11/2009 | Hoffmann et al. | |
| 2011/0212805 A1 * | 9/2011 | Hilker et al. | 475/160 |

FOREIGN PATENT DOCUMENTS

| | | |
|---|---|---|
| EP | 0875690 | 11/1998 |
| JP | 2001090738 A | 4/2001 |
| JP | 2009269605 A | 11/2009 |

OTHER PUBLICATIONS

International Search Report dated Dec. 21, 2012.
Office Action issued by Japanese Patent Office mailed on Apr. 30, 2015 (translated, 4 pages).
English Translation of Office Action from Chinese Patent Office for Application No. 201280048679.0 (5 pages).

* cited by examiner

CLUTCH ASSEMBLY HAVING AN OIL ACCUMULATING DEVICE

CROSS-REFERENCE TO RELATED APPLICATIONS

This application claims priority to, and is a National Phase of, International Application No. PCT/EP2012/068873, filed on Sep. 25, 2012, which in turn claims priority to European Patent Application No. 11183508.8, filed on Sep. 30, 2011, which applications are hereby incorporated by reference in their entirety.

BACKGROUND

A clutch assembly of a motor vehicle transmits drive power to a wheel of an axle, and may include a clutch-controlled equalisation unit, having a clutch device. The equalization unit can be engaged and disengaged and can transmit drive power from a first drive member to a second drive member, where the first drive member is on a drive side of the clutch device, and the second drive member is on the output side of the clutch device. An oil-delivering device is provided to oil the clutch, and the oiling of components on the output side of the clutch is provided. The oil-delivering device is arranged on the drive side of the clutch and delivers oil of an oil circuit serving the clutch device, or is immobilised, depending on an operating state.

A clutch assembly of this type is known from DE 10 2008 002 844 A1. In a differential-free, clutch-controlled equalisation unit, a clutch assembly is provided with an activatable multiple disc clutch for a side shaft, which forms the shaft on the output side of the clutch device. Via the multiple disc clutch the drive power is directed to the connected drive wheel of a motor vehicle as required. The outer disc carrier of the multiple disc clutch, which is coupled to the drive-side shaft, delivers lubricating and cooling oil into an oil delivery pocket provided in a housing 16 of the clutch assembly, from which the oil flows back into a sump formed by the housing 16, is picked up again by the clutch, and is fed back to the circuit. An inner oil circuit therefore forms of a disc pack of a side shaft clutch.

Because of this inner oil circuit, a large proportion of the oil volume used for cooling and lubrication remains for a long time in the described inner oil circuit without the oil volume being sufficiently mixed with, or replaced with, "fresh" oil. The oil volume that has only just absorbed heat between the clutch discs is fed directly back to the discs. The clutch temperature therefore increases over-proportionately to the cooling effect that would be achievable with the oil quantity present in the equalisation unit. The over-proportionate heating of the clutches is disadvantageous in terms of the wear behaviour and thus the service life, as well as in terms of the response and control behaviour.

A further disadvantage of the configuration disclosed in DE 10 2008 002 844 A1 is that the clutch packs of the side shaft clutches are in the oil continuously in order to pick it up and deliver it to the oil collection pocket. The associated splash losses increase the power loss of the drive train.

With regard to the undesirable power loss, it is also the case, even in the case described in DE 10 2008 002 844 A1, in which the secondary part of the drive train is decoupled from the drive wheels and the side shaft clutches are completely open, that the secondary drive wheels roll on the road in driving mode and drag the inner disc carrier and the inner discs connected in a rotationally fixed manner thereto. The inner discs, however, are in constant contact with the oil, because they dip therein. Not only is the region of the extremely narrow air gap (gap width approximately 0.1 mm) between the inner and outer discs, which is situated directly in the oil, filled with oil, but the oil is also conveyed into an interspace, not in the oil, between the inner and outer discs of the multiple disc clutch by the rotating inner discs. The liquid friction or hydrodynamic friction produced as a result in turn transmits the drag torque acting on the inner discs from the secondary drive wheels to the outer discs, thereby driving the outer discs. However, as soon as the outer discs begin to rotate, they in turn convey oil into the above-described inner oil circuit and thus increase the oil volume conveyed, and again therefore increase the friction and power loss. The undesirable effect intensifies by itself to a certain extent.

Experiments have shown that because of this effect the secondary drive train is not immobilised even when decoupled from the primary part of the drive train, in contrast to the assumptions made in DE 10 2008 002 844 A1. The negative consequences of this effect can be reduced only slightly by the low-friction design of the surfaces of the inner discs proposed in DE 10 2008 002 844 A1. Moreover, low-friction surfaces of the inner discs result in a much poorer response and control behaviour of the clutch pack. This disadvantage outweighs the power loss advantages that can be achieved with this measure.

A further disadvantage of the clutch assembly disclosed in DE 10 2008 002 844 A1 is that the cooling and lubricating oil must pass through the inner disc carrier or another drive member on the output side of the clutch device. This makes said another drive member complicated to design.

Given this background, a clutch assembly of the type mentioned in the introduction above, having a simplified design, and avoiding the above-described disadvantages is needed. In particular, it would be desirable to optimise the oiling concept described in DE 10 2008 002 844 A1 with regard to the power loss when a secondary part of the drive train is decoupled from a primary part of the drive train without compromising on response and control behaviour of the clutch packs, and without having a negative effect on the functionality of other components. It would further be desirable to ensure that the secondary axle drive train is completely immobilised when it is disconnected, and that components on the output side of the clutch device continue to be supplied with oil despite the oil-delivering device being in the non-delivering state.

SUMMARY

Accordingly, an oil-damming device is provided that can ensure lubrication of components arranged on the output side of the clutch device when the oil-delivering device does not deliver oil. Components arranged on the output side of the clutch device include components that are arranged in the oil circuit in an operating state in which the oil-delivering device delivers oil for the oil circuit, or are served by the oil provided by the oil circuit. An open rotary bearing may be provided, which is assigned an oil-damming device, which can ensure lubrication of the rotary bearing when the oil-delivering device does not deliver oil.

Such an oil-damming device dams some of the delivered oil in a first operating state in which the oil-delivering device delivers oil. Further, in a second operating state in which the oil-delivering device no longer delivers oil because it has been immobilised, the oil-damming device makes the oil available to components that have been served by the oil provided by the oil-delivering device in the first operating state, and that still have a need for oiling after the oil-delivering device has been immobilised. This feature makes it possible to reduce or isolate the oil level of an oil reservoir from which the oil-delivering device is served from the components having a continuous oiling requirement, even in the second operating state.

The open rotary bearing, by which in particular the output-side shaft or the output-side disc carrier is mounted on a housing, makes it possible to guide the oil flow of the oil circuit serving the clutch device through the open rotary bearing, and therefore to integrate the rotary bearing into the oil circuit. The rotary bearing is therefore also lubricated and cooled by the oil supplied to the clutch device.

The necessity of guiding the oil flow for example through an inner disc carrier, the output-side shaft, or another drive member in particular on the output side of the clutch device—as disclosed in the prior art—no longer applies as a result. In addition, the use of an open rotary bearing results in minimisation of friction losses compared to a closed rotary bearing.

The clutch assembly may be provided as an assembly of a clutch-controlled equalisation unit, with or without a differential, that forms part of an immobilisable secondary part of the overall drive train, as disclosed in DE 10 2008 002 844 A1. If the oil-delivering device is coupled to a drive member on the drive side of the clutch device, in particular to the shaft on the drive side of the clutch device or the drive-side disc carrier, the immobilisation of the secondary part of the drive train, which is effected by the opening of the clutch device, among other things, also results in the immobilisation of the oil-delivering device.

This is desirable, because the power loss that would otherwise be caused by a continuously running oil-delivering device can be thereby avoided when the secondary part of the drive train is immobilised. Moreover, the clutch device, which is in a continuously open state when the secondary part of the drive train is immobilised, can thereby continue to run without losses if certain design requirements, explained below, are implemented.

On the other hand, the interruption in oiling can result in problems with regard to the open rotary bearing. If the rotary bearing is a rotary bearing that is integrated into the oil circuit and bears an output-side drive member, as may be the case, the output-side drive member also rotates when the clutch device is open because the wheels rolling on the road drag the output-side drive members. There would therefore be the risk that the rotary bearing runs dry because of the interruption to the oil delivery as a result of the decoupling of the secondary drive train and the associated immobilisation of the oil-delivering device if an oil-damming device were not provided, which prevents the rotary bearing from running dry even when the oil-delivering device is not operating.

The oil-damming device may be formed by an oil-damming ring having an oil-damming edge together with adjacent components, in particular wall inner sides of a housing in which the clutch assembly is mounted, forming a small oil sump in which the rotary bearing runs. The height of the oil-damming edge is dimensioned such that the oil level of the oil sump ensures sufficient lubrication of the rotary bearing even when the oil-delivering device is not operating. The cross section of the oil-damming device may be L-shaped.

Coupling of the oil-delivering device to a drive member on the drive side of the clutch device can be made in different ways. Either the oil-delivering device is arranged directly on the drive-side drive member, as is the case, for example, when an oil-delivering wheel arranged directly on the drive-side shaft is used. Such an oil-delivering wheel can, for example, be formed by the crown wheel of the angular gear, the crown wheel being arranged on the crown wheel carrier shaft or intermediate shaft 8 forming the shaft on the drive side of the clutch device. Alternatively, the oil-delivering device may be driven indirectly, that is, with the interposition of further components that transmit the drive power necessary for the oil-delivering device from the drive-side drive member to the oil-delivering device.

The oil-delivering device may be arranged at a distance from the clutch device, e.g., not formed directly by an outer disc carrier of a clutch device formed as a multiple disc clutch. The arrangement of the oil-delivering wheel at a distance from the clutch device means that the oil always flows into an oil sump of the equalisation unit at a distance from the clutch device after flowing through the clutch device to be oiled and before it is fed back into the oil circuit. This arrangement ensures sufficient mixing of the entire oil volume, and consequently obtains utilisation of a maximum cooling effect of the total quantity of oil at all times, which in turn reduces a thermal load on the clutch devices. This arrangement also ensures that the clutch device can run dry with the clutch open, and thus the secondary part of the drive train disconnected, whereby no clutch discs are continuously in the oil.

Said configuration also makes it possible to configure the oil-delivering device, which can in particular be formed by an oil-delivering wheel arranged on a drive-side shaft, such that it can deliver the cooling and lubricating oil from an oil sump having an oil level below the clutch device. The clutch device, e.g., including the dragged clutch components, can thus be situated permanently above the oil level. Even components dragged continuously by the rolling drive wheels cause no friction losses, in particular no splash losses or losses owing to hydrodynamic effects, when the clutch is open, that is, when the secondary part is disconnected.

The oil-delivering device may have an oil-delivering wheel that is formed by a crown wheel arranged on the drive-side shaft, by which, as a component of the angular gear, the drive power introduced by the Cardan shaft is transmitted to the shaft on the drive side of the clutch device. In particular, if the crown wheel itself may not have a sufficient diameter to dip into an oil sump situated below the clutch device owing to the dimensioning of the crown wheel, that is, it in particular has a smaller diameter than the outer disc carrier of the clutch device used. In this case, the oil-delivering wheel can comprise the crown wheel arranged on the drive-side shaft, the crown wheel being extended radially outwards, for example, by an oil-delivering ring additionally placed onto the crown wheel. This radial extension can be formed as an integral, single-piece component of the crown wheel. To reduce cost and/or weight, and to keep masses to be accelerated and braked low, the radial extension, in particular the oil-delivering ring, may be manufactured as a separate component using a lighter material, and to connect the oil-delivering ring to the crown wheel.

It is not strictly necessary to realise the oil-delivering wheel with the aid of a gearwheel of the differential gear situated within the power flow. An oil-delivering wheel separate from the crown wheel can also be provided on the input shaft or intermediate shaft.

Further disclosed herein is the use of an oil-damming device as described above and below in a clutch assembly forming part of a clutch-controlled equalisation unit with or without a differential, in which the rotary decoupling of the drive-side and output-side shaft is necessary for operation with an open clutch. For example, vehicles may have a clutch-controlled, differential-free equalisation unit instead of a conventional differential. Further, vehicles in which a secondary part of the drive train is provided for optional operation of the vehicle with all-wheel drive, where the secondary part of the drive train can be included in the flow of drive power optionally in what is known as disconnect operation, may be equipped with such an equalisation unit.

An equalisation unit, the component of which may be the clutch assembly, can be either a transverse or a longitudinal equalisation unit. For example, a transverse equalisation unit may be used, e.g., a differential-free transverse equalisation unit operating purely frictionally, in which the side shafts of the drive wheels are coupled to the flow of drive power by side shaft clutches. Further, conventional longitudinal and transverse differentials operating in a form-fitting manner, in order to oil clutch packs of the differential locks, may be used.

BRIEF DESCRIPTION OF THE DRAWINGS

Further features and advantages of the presently disclosed subject matter can be found in the subclaims and the description of preferred exemplary embodiments using the drawings below.

In the drawings.

DETAILED DESCRIPTION OF EXEMPLARY EMBODIMENTS

Figure 1:
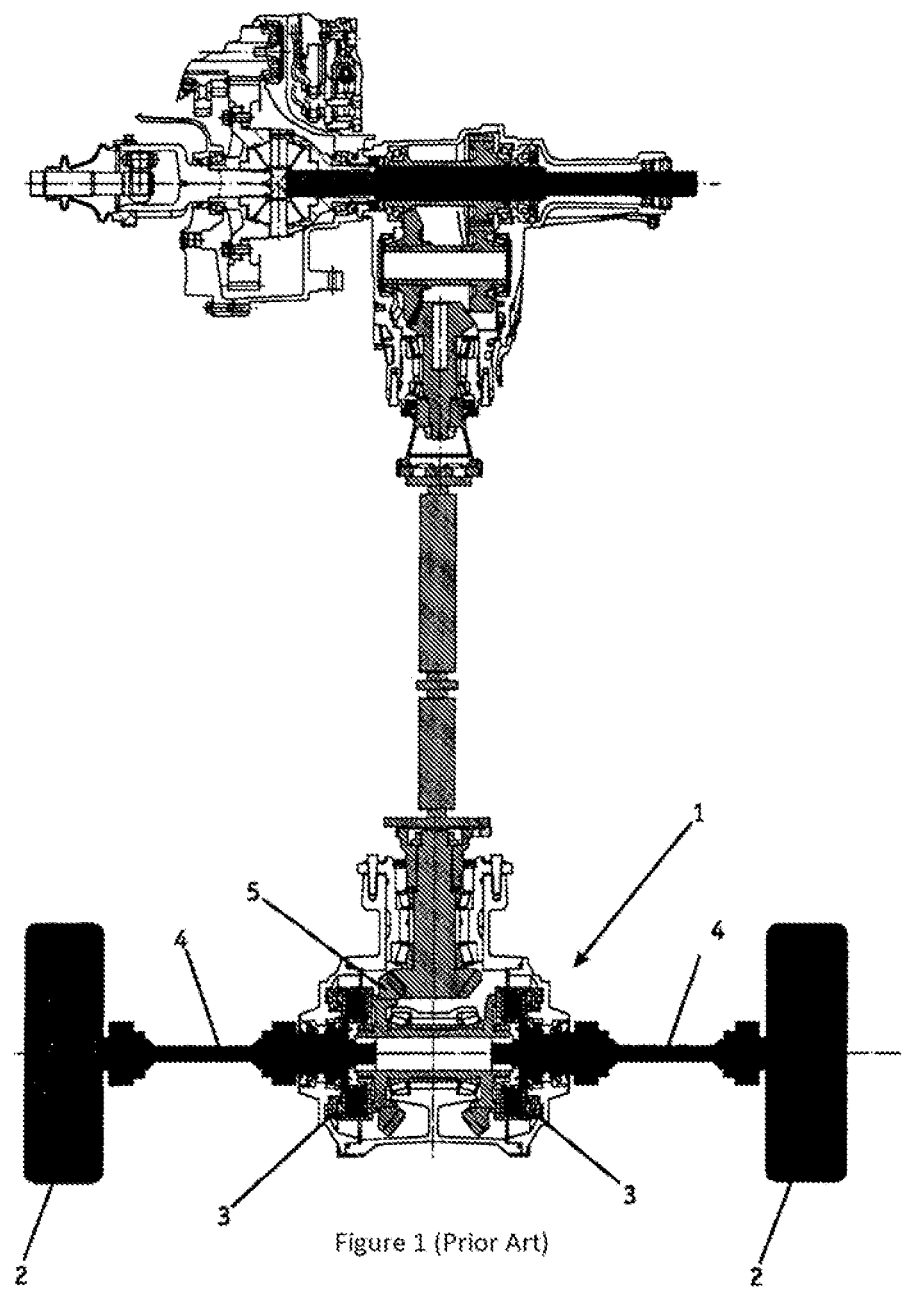
FIG. 1 shows a drive train construction having a continuously driven primary part and a secondary part that is only driven when required, and a differential-free equalisation unit (prior art)

FIG. 1 shows a drive train construction known from the prior art, having a continuously driven primary part and a secondary part that is only driven when required, the secondary part having a differential-free equalisation unit 1 for driving the secondary drive wheels 2. The secondary part of the drive train, the drive members of which can be coupled to and disconnected from the primary part of the drive train depending on requirements, is shown cross-hatched, while the drive members that interact with the secondary part to transmit power during driving operation and rotate continuously are shown with solid black lines. The secondary part of the drive train should be completely immobilised after successful decoupling from the primary part of the drive train.

The equalisation unit 1 is a differential-free equalisation unit, in which the flow of power is transmitted via two individually activatable clutch devices, formed by side shaft clutches 3, and via the side shafts 4, to the secondary drive wheels 2. The side shaft clutches 3, which are formed by frictionally operating multiple disc clutches, not only equalise the different rolling paths of the secondary axle drive wheels 2 during cornering, but are also used to actively influence dynamic driving behaviour. The clutches must be oiled with cooling and lubricating oil during operation.

Experiments with the system shown in FIG. 1 have shown that, even if the secondary part of the drive train is decoupled from the primary part, in particular if it is decoupled during driving and at speeds upwards of approximately 50 km/h, the drive members of the secondary part, that is, the drive members on the drive side of the clutches 3, are not immobilised as desired. Instead, these drive members continue to rotate owing to drag power introduced into the side shaft clutches 3 by the secondary drive wheels 2, thus causing power loss. As described above, this power loss is attributable in particular to the oiling concept used in the prior art and the oil level necessary for it, with which the side shaft clutches are continuously in the oil even when the secondary drive train is decoupled.

Figure 2:
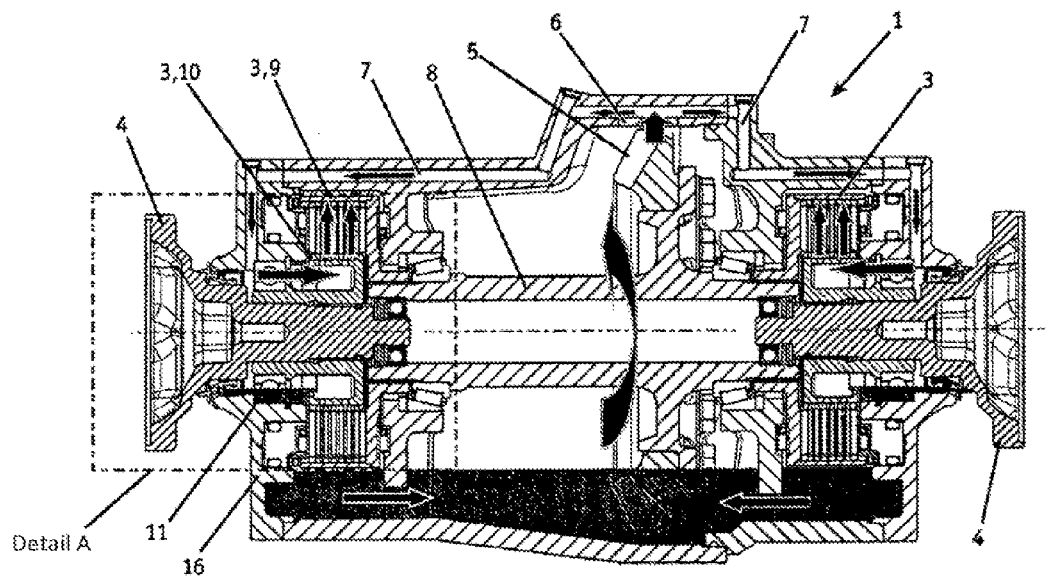
FIG. 2 shows a partial view of a clutch assembly for a drive train according to FIG. 1 in cross-section.

FIG. 2 shows a differential-free equalisation unit 1, which may be provided for use in a drive train as shown in FIG. 1, during operation with an oil-delivering device formed by a crown wheel 5 for oiling the clutch. When the secondary axle is connected, the crown wheel 5 scoops the oil owing to its rotation along a housing 16 inner wall to an oil collection pocket 6 provided in the housing. From there, it passes via oil supply channels 7 to the side shaft clutches 3. The crown wheel 5 is arranged on the intermediate shaft 8 and is driven by a Cardan shaft (not shown).

Compared to a solution in which the discs of the side shaft clutches primarily deliver the oil themselves, use of the crown wheel 5 as the oil-delivering device ensures that the oil flowing back from the clutches 3 collects in the oil sump and mixes with the overall oil volume before it is fed back to the oil circuit. A situation is avoided in which an inner oil circuit forms, as a result of which the oil is fed directly back to the clutches after having flowed through them, so that the oil would be over-proportionately heated as a result.

It can also be seen in FIG. 2 that the oil level in the oil sump, indicated by the grey area, lies below the side shaft clutches 3 both in the operating state and when immobilised. This also contributes to minimizing power loss, because the clutch members dragged by the side shafts 4 are not in the oil, and thus cannot convey oil between the clutch discs. When the secondary part of the drive train is decoupled from the primary part, the clutches can therefore run completely dry and thus rotate in a friction-minimised manner.

Figure 3:
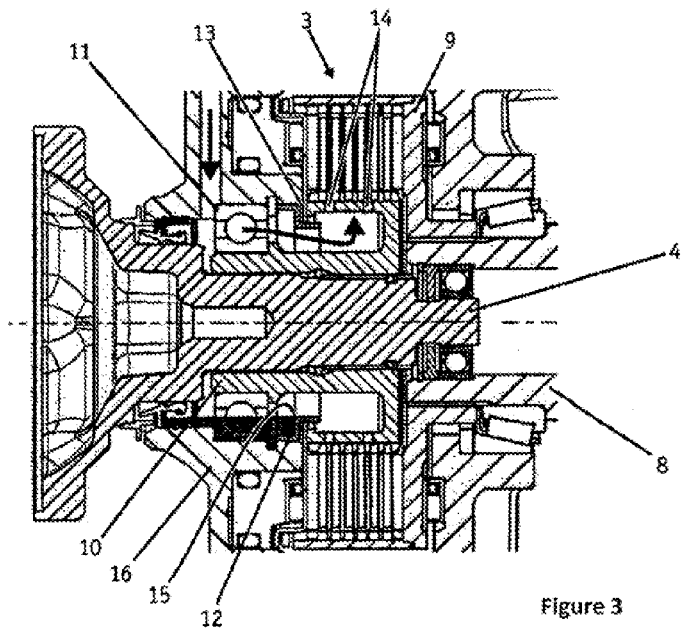
FIG. 3 shows a detail A from FIG. 2.

FIG. 3 shows the detail A indicated in FIG. 2. A crown wheel 5 (see FIG. 2) arranged on an intermediate shaft 8 is driven in a known manner by a bevel wheel (not shown) driven by a Cardan shaft. The outer disc carrier 9, which belongs to the clutch device 3, and is the input side of the clutch 3 and therefore a drive-side drive member, is connected in a rotationally fixed manner to the intermediate shaft 8, which is likewise a drive-side drive member. When the clutch is closed, the outer disc carrier 9 transmits the drive power via the outer discs of the clutch device 3, which is configured as a multiple disc clutch, to the inner discs, via which the drive power is transmitted to the inner disc carrier 10, which is an output-side drive member. The inner disc carrier 10 is in turn connected in a rotationally fixed manner to a side shaft 4, a further output-side drive member. The drive power is transmitted to the secondary drive wheels 2 via the side shaft 4, where necessary with the interposition of further drive members. When the clutch 3 is open, no forces are transmitted.

As shown in FIGS. 2 and 3, an oil-damming device 12 in the form of an oil-damming ring is provided in the region of an open rotary bearing 11, with which the output-side drive members inner disc carrier 10 and side shaft 4 are mounted in a housing.

The rotary bearing 11 is configured as an open rotary bearing and is integrated into the oil circuit, as can be seen by the arrows indicating the oil flow in FIGS. 2 and 3. This means that the oil delivered by the oil-delivering device 5 is guided in a targeted manner through the open rotary bearing 11. The inner disc carrier 10 and the side shaft 4 can as a result be configured without specific design measures that would allow the oil to flow through past a closed bearing. When the secondary axle is connected, that is, when the oil-delivering device 5 is delivering oil, the open rotary bearing 11 is lubricated by the oil flow, whereas when the secondary axle is decoupled, that is, when the drive members on the drive side of the clutch device are immobile, this oil flow is interrupted. The oil-damming device 12 ensures that, even when the secondary axle is decoupled, sufficient oil is available to the rotary bearing 11 for its lubrication, in that the device together with the adjacent components such as the housing 16 inner wall and the radial shaft sealing ring forms an oil sump. The dammed oil is symbolised by the grey area in FIGS. 2 and 3.

The cross section of the oil-damming device 12 may be formed, by way of example as a press-fit bush, and may be held in the housing next to the rotary bearing 11, separated from the rotary bearing 11 only by an additional securing ring. This arrangement has the effect, owing to its configuration in the form of a horizontal "L" pointing inwards with its damming edge, that the lubrication of the open rotary bearing 11 is ensured even when the secondary part of the drive train is decoupled and the oil-delivering device 5 is immobilised owing to the operating state and does not deliver any oil. The cross section of the oil-damming device shown can of course vary as long as it ensures the desired oil-damming effect. The damming edge, which points inwards to the geometric rotation axis, can also have a further bend pointing outwards in the direction of the rotary bearing 11 or a corresponding kink, so that dammed oil can be kept better in the oil sump in the case of any centrifugal forces that occur.

The oil-damming device 12 also serves as an oil-directing plate. The device 12 projects beyond the gap 13 formed between the housing and the disc carrier and thus guides the oil to radial bores 14, which are provided in a web of the disc carrier 10, when the secondary axle is connected. The oil is thus guided to the disc pack in a targeted manner. It can be distributed optimally in the disc pack and in particular does not penetrate, or only penetrates in insignificant amounts, into the said gap 13, which would result in an excessive proportion of the oil flowing past the disc pack or being poorly distributed and as a result not participating optimally in the cooling and lubrication of the disc pack. The use of such an oil-directing plate is considered an independent invention regardless of whether the oil-directing plate also has an oil-damming function or not.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A clutch controlled equalization unit designed to transmit power to a wheel of an axle of a motor vehicle, the clutch controlled equalization unit comprising:
   a clutch device arranged to be engaged and disengaged, and to transmit drive power from a first drive member to a second drive member, the first drive member being on a drive side of the clutch device and the second drive member being on an output side of the clutch device;
   an oil-delivering device coupled to the first drive member and arranged to deliver oil depending on an operating state that is one of a first operating state in which oil is delivered and a second operating state in which oil is not delivered; and
   an oil-damming device, arranged to ensure lubrication of components arranged on the output side of the clutch device when the oil-delivering device does not deliver oil;
   wherein in the first operating state at least one of two conditions is present with the conditions being a first condition in which the first drive member is connected to a flow of drive power and a second condition in which the clutch device is engaged and
   wherein in the second operating state the clutch device is disengaged and the first drive member is disconnected from the flow of drive power and the oil delivering device is immobilized and the second drive member is rotating.

2. The clutch controlled equalization unit of claim 1, further comprising a rotary bearing that is assigned to the oil-damming device.

3. The clutch controlled equalization unit of claim 2, wherein the rotary bearing is an open rotary bearing that is included in an oil circuit through which oil may flow in the clutch assembly.

4. The clutch controlled equalization unit of claim 2, further comprising a housing having inner walls in which the output-side drive members are mounted by the rotary bearing, wherein the oil-damming device, together with parts of the inner walls of the housing, forms an oil sump in which the rotary bearing is arranged to run.

5. The clutch controlled equalization unit of claim 4, wherein the oil-damming device includes an oil-damming edge having a height such that an oil level of the oil sump provides lubrication of the rotary bearing when the oil-delivering device is not operating.

6. The clutch controlled equalization unit of claim 1, wherein the oil-damming device is formed by an oil-damming ring.

7. The clutch controlled equalization unit of claim 1, wherein the oil-damming device includes an L-shaped cross section.

8. The clutch controlled equalization unit of claim 1, wherein the oil-damming device is formed by a press-fit bush.

9. The clutch controlled equalization unit of claim 1, wherein the oil-damming device bridges a gap between parts of the clutch device and a housing.

10. The clutch controlled equalization unit of claim 1, wherein the oil-delivering device is formed by an oil-delivering wheel that is separate from the clutch device.

11. The clutch controlled equalization unit of claim 10, wherein the oil-delivering wheel is formed such that it can deliver oil out of an oil sump having an oil level below the clutch device.

12. The clutch controlled equalization unit of claim 1, wherein the oil-delivering device is coupled to an intermediate shaft that is on the drive side of the clutch device, and that bears a crown wheel as the shaft of an angular gear, whereby the crown wheel is arranged to be used as an oil-delivering wheel.

13. A method, comprising using the clutch controlled equalization unit of claim 1.

14. The clutch controlled equalization unit of claim 1, wherein the oil-delivering device is arranged on the drive side of the clutch device.

\* \* \* \* \*